(12) United States Patent
Calderon et al.

(10) Patent No.: US 7,656,891 B1
(45) Date of Patent: Feb. 2, 2010

(54) METHOD AND APPARATUS ENABLING CONCURRENT PROCESSING OF CONTIGUOUSLY AND VIRTUALLY CONCATENATED PAYLOADS

(75) Inventors: Juan-Carlos Calderon, Fremont, CA (US); Soowan Suh, San Ramon, CA (US); Jing Ling, Fremont, CA (US); Jean-Michel Caia, San Francisco, CA (US); Alejandro Lenero Beracoechea, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 10/912,766

(22) Filed: Aug. 4, 2004

(51) Int. Cl.
*H04B 7/212* (2006.01)
(52) U.S. Cl. .................. 370/442; 370/412
(58) Field of Classification Search .......... 370/412, 370/413, 417, 428, 429, 458, 375, 378, 379, 370/465, 466, 470, 474, 476
See application file for complete search history.

(56) References Cited

U.S. PATENT DOCUMENTS

| | | | | |
|---|---|---|---|---|
| 5,166,932 A * | 11/1992 | Hoff et al. | ............... | 370/349 |
| 5,260,937 A * | 11/1993 | Eames et al. | ............... | 370/376 |
| 5,477,541 A * | 12/1995 | White et al. | ............... | 370/392 |
| 5,629,939 A * | 5/1997 | Ohde et al. | ............... | 370/378 |
| 5,719,858 A * | 2/1998 | Moore | ............... | 370/347 |
| 5,748,630 A * | 5/1998 | Bergantino et al. | ............... | 370/412 |
| 5,809,021 A * | 9/1998 | Diaz et al. | ............... | 370/364 |
| 6,404,766 B1 * | 6/2002 | Kitai et al. | ............... | 370/392 |
| 6,697,374 B1 * | 2/2004 | Shraga et al. | ............... | 370/458 |
| 6,980,541 B2 * | 12/2005 | Shvodian | ............... | 370/346 |
| 6,985,455 B1 * | 1/2006 | Heath et al. | ............... | 370/316 |
| 7,149,186 B1 * | 12/2006 | Hey | ............... | 370/232 |
| 7,173,930 B2 * | 2/2007 | Wellbaum et al. | ............... | 370/356 |
| 7,215,679 B2 * | 5/2007 | Pugel | ............... | 370/412 |
| 7,230,917 B1 * | 6/2007 | Fedorkow et al. | ............... | 370/229 |
| 7,324,546 B1 * | 1/2008 | Rowett et al. | ............... | 370/458 |
| 2003/0095563 A1 * | 5/2003 | Wu | ............... | 370/442 |
| 2003/0179769 A1 * | 9/2003 | Shi et al. | ............... | 370/442 |
| 2004/0028071 A1 * | 2/2004 | Gehring et al. | ............... | 370/442 |
| 2005/0089054 A1 * | 4/2005 | Ciancaglini et al. | ............... | 370/412 |
| 2005/0246481 A1 * | 11/2005 | Rohit et al. | ............... | 711/105 |
| 2006/0050730 A1 * | 3/2006 | Shvodian | ............... | 370/458 |
| 2006/0140160 A1 * | 6/2006 | Vendel et al. | ............... | 370/337 |

* cited by examiner

*Primary Examiner*—Chi H. Pham
*Assistant Examiner*—Kevin Mew
(74) *Attorney, Agent, or Firm*—Blakely, Sokoloff, Taylor & Zafman LLP

(57) ABSTRACT

A method and apparatus for processing at least two types of payloads received at varying intervals in a communications network using a single processing path is provided. The two types of payloads may include virtually and contiguously concatenated payloads according to SONET/SHD architecture. The method comprises interleaving data in a predetermined format and controlling distribution of the data irrespective of the format received such that the data can be processed at the destination and passed to downstream components.

25 Claims, 7 Drawing Sheets

METHOD AND APPARATUS ENABLING CONCURRENT PROCESSING OF CONTIGUOUSLY AND VIRTUALLY CONCATENATED PAYLOADS

BACKGROUND OF THE INVENTION

1. Field of the Invention

The present invention relates generally to the field of high speed data transfer, and more specifically to managing contiguously and virtually concatenated payloads in specific data transfer architectures, such as SONET/SDH.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

SONET/SDH may employ at least two different types of payloads called contiguously concatenated payloads and virtually concatenated payloads. The difficulty with employing both contiguously concatenated and virtually concatenated payloads is that multiple paths may be required to process data received in both formats. Two paths and/or two processors may typically be employed to address both types of payloads. Contiguously concatenated payloads may, for example, be provided on one path and processed with knowledge that only contiguously concatenated data is received, while virtually concatenated payloads may be processed on another path with similar knowledge about the payloads received. While separate pipelines and/or separate processors may enable systematic and straightforward processing, such a multiple path implementation tends to decrease throughput and is generally inefficient. Further, the data received may include payloads having odd sizes, such as sizes differing from the data path width of eight byte words. Receipt and processing of odd sized data requires expeding additional resources, which is undesirable.

A design that enables both contiguously concatenated payloads and virtually concatenated payloads to be processed irrespective of the type of payload received may provide increased throughput and other advantageous qualities over previously known designs, including designs employing the SONET/SDH architecture.

DESCRIPTION OF THE DRAWINGS

The present invention is illustrated by way of example, and not by way of limitation, in the figures of the accompanying drawings in which:

FIG. 6 illustrates one example of the distribution of data by a first control memory, typically as the data is received by the destination de-mapper;

FIG. 7 is a remapping of data to be format independent such that all slots include contiguous data;

DETAILED DESCRIPTION OF THE INVENTION

Figure 1A:
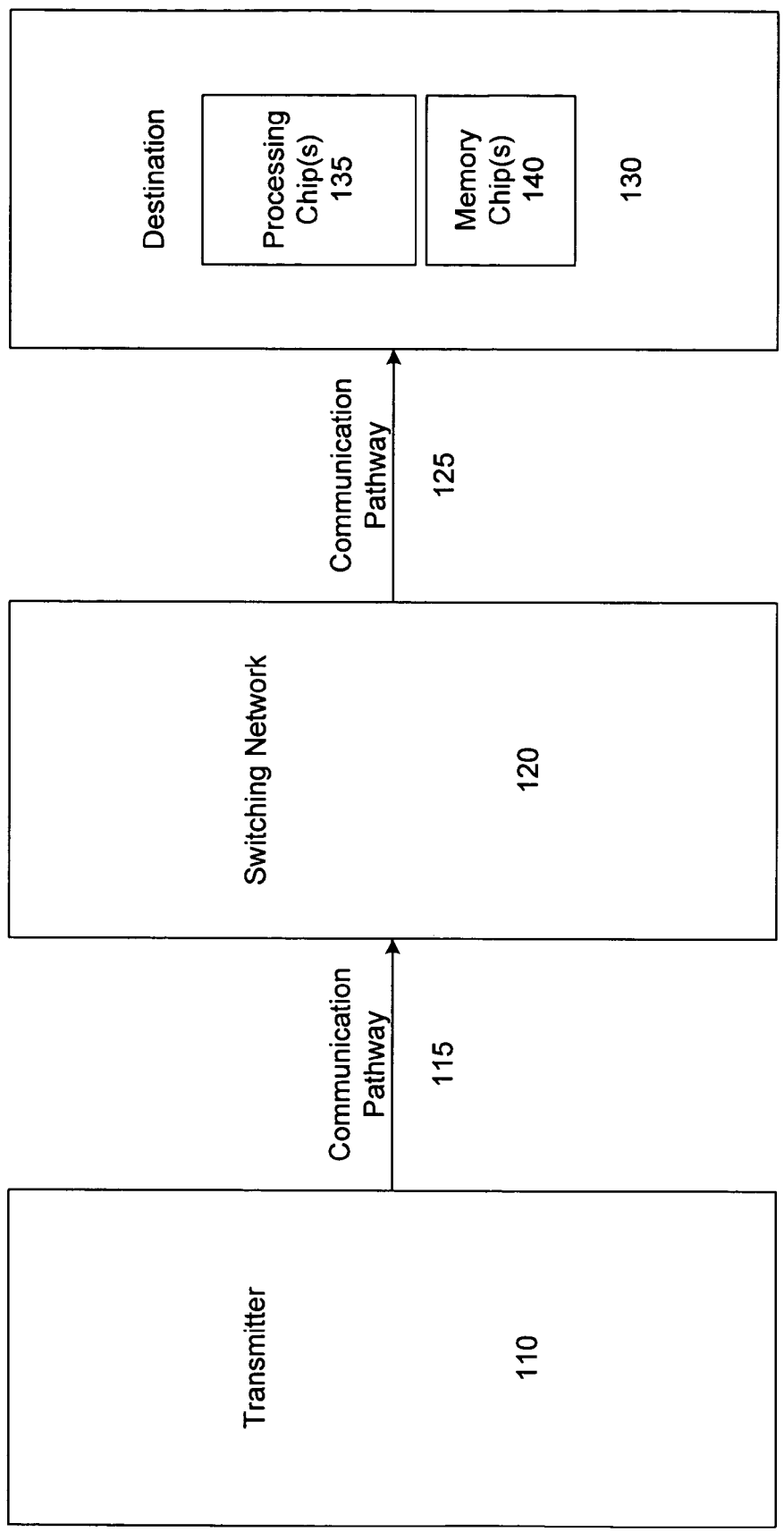
FIG. 1A is a conceptual illustration of a SONET/SDH communications switching system employing the design provided herein.

The present design provides for simultaneously addressing payloads or packets of data having different sizes or parameters. While the description provided herein is applicable to the SONET/SDH architecture, it is to be understood that the invention is not so limited, and may be employed in other transmission architectures.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1 or virtual tributary. All inputs received are eventually converted to a base format of a synchronous STS-1 signal at 51.84 Mbps or higher. Several synchronous STS-1s may then be multiplexed together in either a single or two stage processes to form an electrical STS-n signal, where n is one or more.

SONET uses as a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

The SONET/SDH architecture supports contiguous concatenation, wherein a few standardized "concatenated" signals are defined, and each concatenated signal is transported as a single entity across the network. The concatenated signals are obtained by assembling, end to end, the payloads of the constituent signals, to form the contiguously concatenated payload. The payloads of the constituent signals arrive in fixed sizes, namely sizes specified for the SPE and STS arrangements described above. In creating, assembling or processing the contiguously concatenated payloads, the SONET/SDH standards establish certain rules for the arrangement or placement of standard concatenated signals.

These rules were intended to ease the development burden for SONET/SDH designers, but the rules can significantly affect the bandwidth efficiency of SONET/SDH links.

In order to address certain issues with contiguously concatenated payloads, the SONET/SDH architecture also supports Virtually Concatenated Payloads. Virtual concatenation enables dividing payloads to improve partitioning of SONET/SDH bandwidth and more efficiently carry traffic. Virtual concatenation employs the base SONET/SDH payloads and groups these payloads together to create a larger, size appropriate aggregate payload based on the STS and SPE employed. Virtual concatenation thus enables variation of the payload capacity and allows payload sizes matching client service data rate. This sizing enhancement allows a larger number of channels to be mapped into the SONET/SDH signal.

A typical SONET/SDH switching system 100 is shown in FIG. 1A. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 1B:
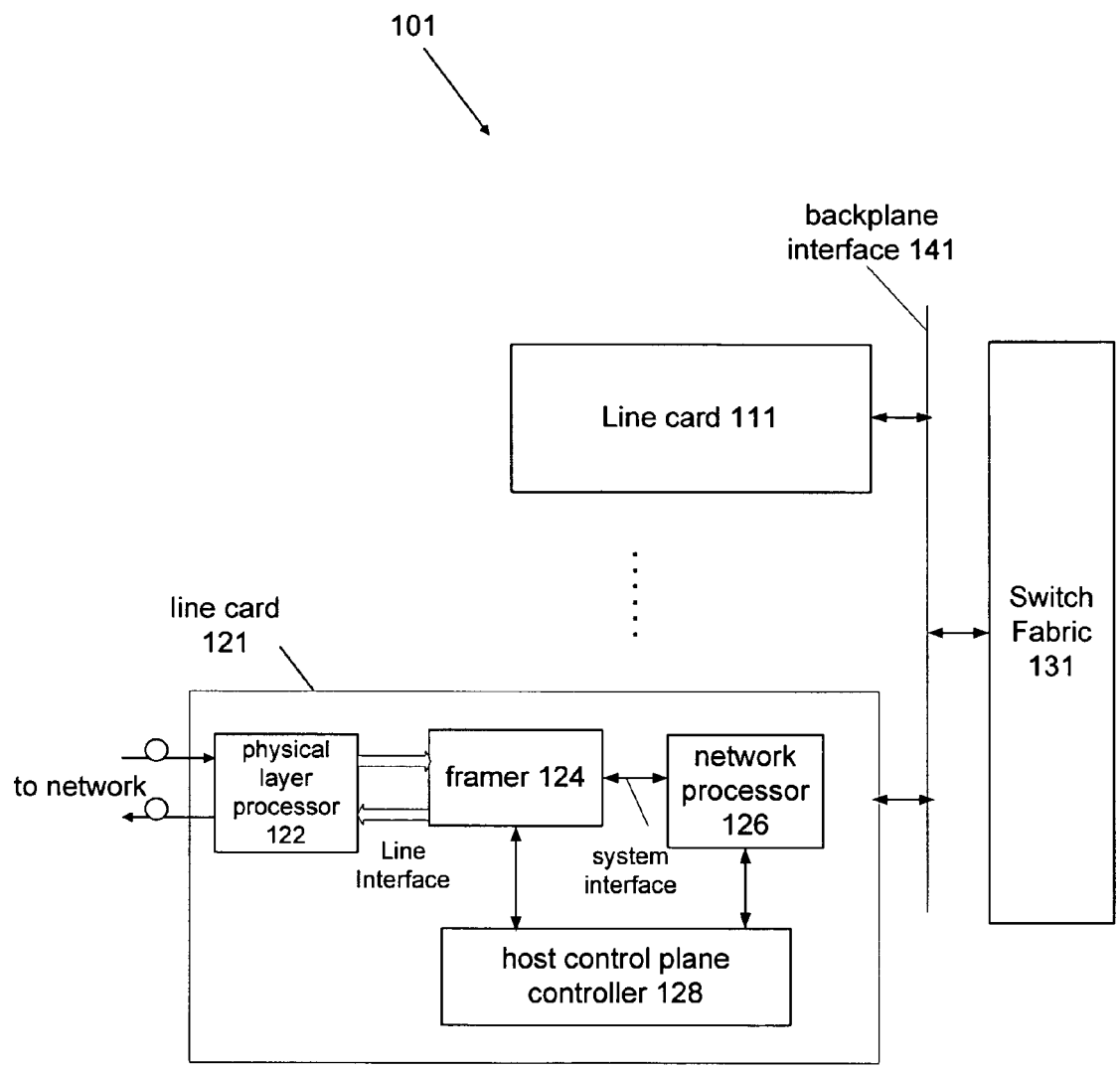
FIG. 1B shows a suitable system embodiment in accordance with an embodiment of the present invention.

FIG. 1B depicts a suitable system embodiment in accordance with an embodiment of the present invention. System 101 may include line card 111, line card 121, system fabric 131, and backplane interface 141. Line card 111 may be implemented as a SONET/SDH add-drop multiplexer, a Fibre Channel compatible line input, an Ethernet line input or a SONET/SDH line input.

Line card 121 may be implemented as a transceiver capable of transmitting and receiving frames and/or packets to and from a network that is compatible with SONET/SDH as well as other protocols such as OTN, TFI-5, and Ethernet, although other standards may be used. For example, SONET/SDH and OTN are described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

For example, the network may be any network such as the Internet, an intranet, a local area network (LAN), storage area network (SAN), a wide area network (WAN). One implementation of line card 121 may include physical layer processor 122, framer 124, network processor 126, and host-control plane controller 128.

Physical layer processor 122 may receive optical or electrical signals from the network and prepare the signals for processing by downstream elements such as framer 124. For example, for frames and/or packets received from the network, physical layer processor 122 may convert an optical signal to electrical format and/or remove jitter from signals from the network. For frames and/or packets to be transmitted to the network, physical layer processor 122 may remove jitter from signals provided by upstream devices such as framer 124 and prepare signals for transmission to the network, which may be optical or electrical format. Framer 124 may utilize embodiments of the present invention to construct frames and/or packets for transmission to a network in formats such as Ethernet, SONET/SDH, and/or OTN (although other formats may be used).

For frames and/or packets received from a network, framer 124 may utilize embodiments of the present invention to process such frames and/or packets. Framer 124 may transfer overhead from frames and/or packets to a higher layer level processor such as a network processor 126. For example, framer 124 and network processor 126 may intercommunicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Network processor 126 may perform layer 2 or layer 3 (as well as other higher layer level) processing on frames and/or packets provided by and to framer 124 in conformance with applicable link, network, transport and application protocols. Network processor 126 also may perform traffic management at the IP layer.

Host-control plane controller 128 may configure operation of framer 124 and network processor 126. For example, host-control plane controller 128 may program/provision framer 124 to control the content of frames. Host-control plane controller 128 could be implemented as separate from network processor 126 and communicate with the framer 124 and network processor 126 using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. Host-control plane controller 128 could be implemented as part of network processor 126, although other implementations may be used.

In one implementation, components of line card 121 may be implemented among the same integrated circuit. In another implementation, components of line card 121 may be implemented among several integrated circuits that intercommunicate using, for example, a bus or conductive leads of a printed circuit board.

Backplane interfaces 131 may be implemented as a single or multi-pin interface and may be used by line cards to interface with system fabric 141. For example, backplane interfaces 131 may be compatible with TFI-5 or CSIX (described in CSIX-L1: Common Switch Interface Specification-L1 (2000)), although other standards may be used. System fabric 141 may transfer IP packets or Ethernet packets (as well as other information) between line cards based on relevant address and header information. System fabric 141 can be implemented as a packet switch fabric or a TDM cross connect. System fabric 141 can be any device (or devices) that interconnect numerous dataplanes of subsystems (i.e. linecards) together.

In the SONET/SDH architecture, payloads may be transmitted in contiguously concatenated payloads and virtually concatenated payloads. The contiguous concatenation payload scheme uses a concatenation indicator in the pointer associated with each concatenated frame. The concatenation indicator indicates that the SPEs associated with the pointers are concatenated. Generally, every intermediate node or intermediate hardware/software component through which the concatenated payload passes is configured to support contiguous concatenation. Payloads are generally of fixed sizes in contiguous concatenation.

Contiguously concatenated payloads addressed may include those having payloads and data transfer rates designated in SONET/SDH as VC-4-Xc, where x is 1, 4, 16, or 64 for standard rate and other values between 1 and 64 for non-standard rate. Generally, these represent virtual containers of data, where, for example, VC-4-4c is a virtual container with four columns of fixed data, namely one column of path overhead and three columns of fixed "stuff," and 1040 columns of payload data. VC-4-Xc virtual containers are loaded into an STM-X signal, where standard values of X are 4, 16, etc. FIG. 2A shows a non-standard empty STM-8 signal 200 having eight time slots 201-208. FIG. 2B shows a non-standard STM-8 signal having one VC-4-4c virtual container 209 in time slots 1-4 and four VC-4 virtual containers 210-213 included in time slots 5-8. Other contiguously concatenated payload arrangements may be employed. Data transfer rates for these designations have the following values: VC-4-4c is 599.040 Mbit/s, VC-4-16c is 2,396.160 Mbit/s, and VC-4-64c is 9,584.640 Mbit/s.

Virtual concatenation is available as an alternative to contiguous concatenation in transmitting payloads across the network. In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the source 110 and the destination 130 for the network is the only specialized hardware required. The destination 130 reassembles the SPEs in the correct order to recover the data. To compensate for different arrival times of the received data, a phenomenon known as differential delay, the receiving circuits has typically contained some buffer memory so that the data can be properly realigned.

The transmission rates and capacities of virtually concatenated payloads may vary, and may include, for example, SONET/SDH designations VC-3 and VC-4, which have payload capacities of 48.960 Mbit/s and 149.760 Mbit/s, respectively. Again, the VC-3 and VC-4 designations represent the virtual containers where, for example, VC-4 includes 9 rows of 261 columns transmitted in a 125 microsecond interval, and VC-3 is 9 rows of 85 columns transmitted in the 125 microsecond interval.

The common challenge faced occurs upon reception of both contiguously concatenated payloads and virtually concatenated payloads. When both types of payloads are received, they are typically stored in storage buffers and reassembled either by separate processors or by a single processor that must await receipt of all payloads, contiguously or virtually concatenated. Due to the differential delay, data or payloads in the same group may arrive at the destination 130 at different times. In a dual processor or dual channel configuration, the system can be slow to act on the payloads received.

Processing Frames

Figure 2:
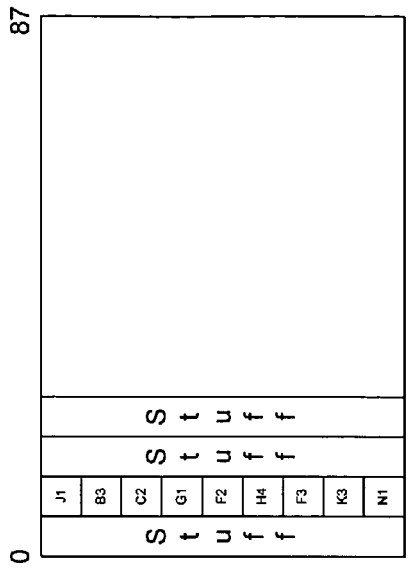
FIG. 2 illustrates removal of stuff columns from VC-3 frames carried via TUG-3.
Figure 2:
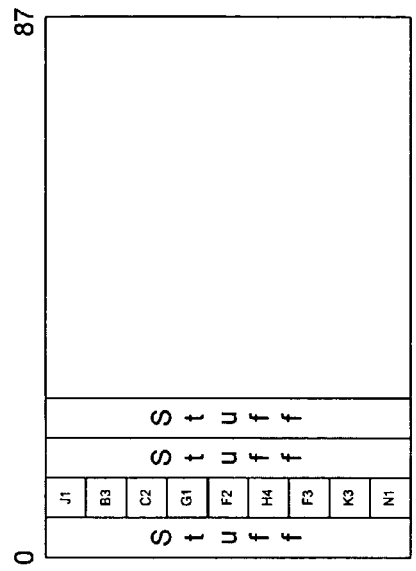

The virtually concatenated and contiguously concatenated structures essentially provide three different types of containers, TU-3, STS-1/AU-3, and STS-3c/AU-4) and two different types of payloads (VC-3 and VC-4). Due to the SONET/SDH column interleaving, an STS-3Xc SPE has a format similar to X STS-3c SPEs. Certain overhead (POH) columns in STS-3c SPEs become "stuff" columns, or columns containing immaterial values, if the system employs the STS-3Xc SPE format. For each VC-3 frame, 85 bytes are included in each row. To make the number of bytes a multiple of eight, the system adds three bytes of stuff to each row. For VC-3 frames carried via TU-3, the system deletes the higher order VC-4 column, the stuff column, and the column having low order pointers. The result is as shown in FIG. 2.

Figure 3:
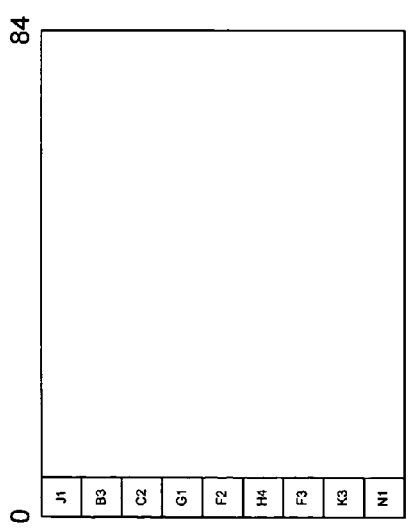
FIG. 3 shows removal of stuff columns from VC-3 frames carried via AU-3 or STS-1.
Figure 3:
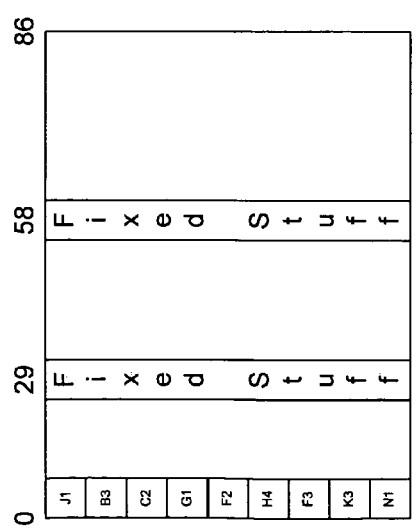
Figure 4:
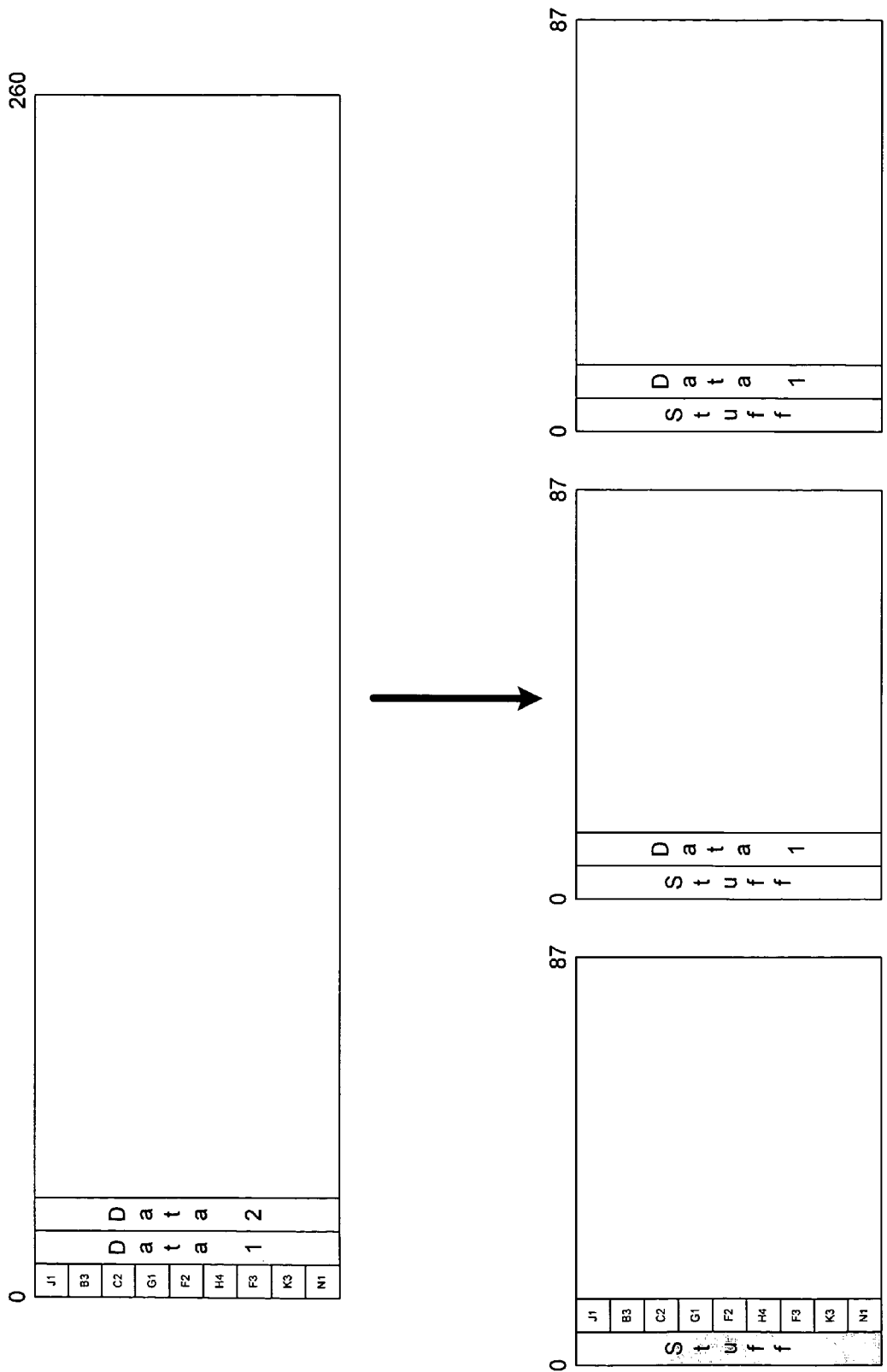
FIG. 4 illustrates manipulating STS-3c SPE/VC-4 frame data to a format similar to VC-3.

For VC-3 frames carried via AU-3 or STS-1, the system removes the two stuff columns, namely columns 30 and 59, providing the result shown in FIG. 3. For payloads of an STS-3c SPE/VC-4 frame, 261 bytes are provided in each row. As a VC-4 frame uses about three times the bandwidth of a VC-3 frame, one third of a VC-4 row is equivalent to a VC-3 row. The system thus adds stuff bytes for each 85 bytes of the VC-3 to make 87 bytes per row, as 87 bytes is one third of the 261 bytes of the VC-4 frame. The addition of three stuff bytes (for every 261 bytes) in this manner provides an 88 byte format similar to the VC-3 frame format, as illustrated in FIG. 4. For each of the three available formats, the POH bytes, when available, are always located at the same position. Common formatting as described and illustrated enables simplified processing and formatting, where the same POH byte, such as the H4 byte for virtual concatenation processing, is always available at the same place in any given frame irrespective of frame format.

Flexible Data Assembly

Figure 5:
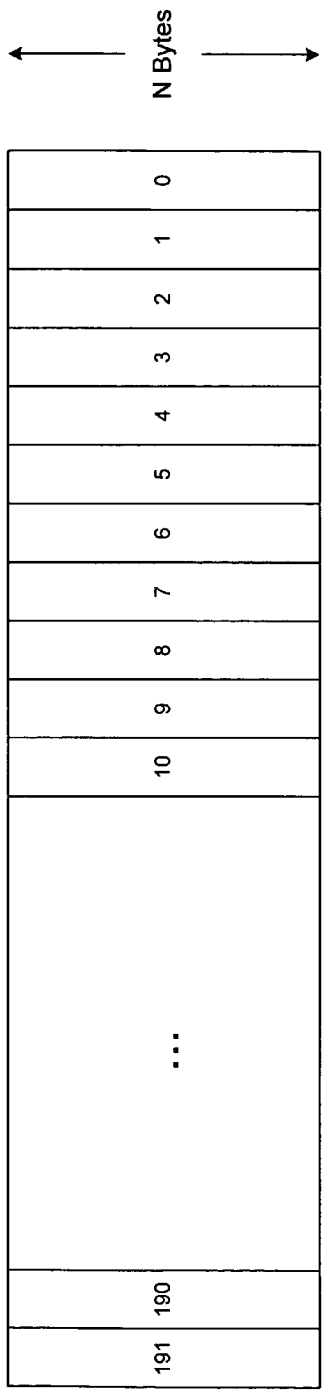
FIG. 5 shows the general data format for both contiguously and virtually concatenated data.

In SONET/SDH arrangements, the incoming time slots are column interleaved or byte interleaved as received, or in other words without processing the data. Data bytes from the time slots of each STS-1 may be assembled into data words with the width of the time slots equal to the data path width, thereby using a wide, shared data path for all time slots/payloads. For example, to process an STS-192 (10 Gbps) data stream at 155 MHz frequency, the data path width may be eight bytes. Input to the data de-mapper has format shown in FIG. 5, where N is equal to the data path width, equal to eight in this example. Each rectangle of FIG. 5 represents one word from the corresponding time slot.

Figures 6, 7:
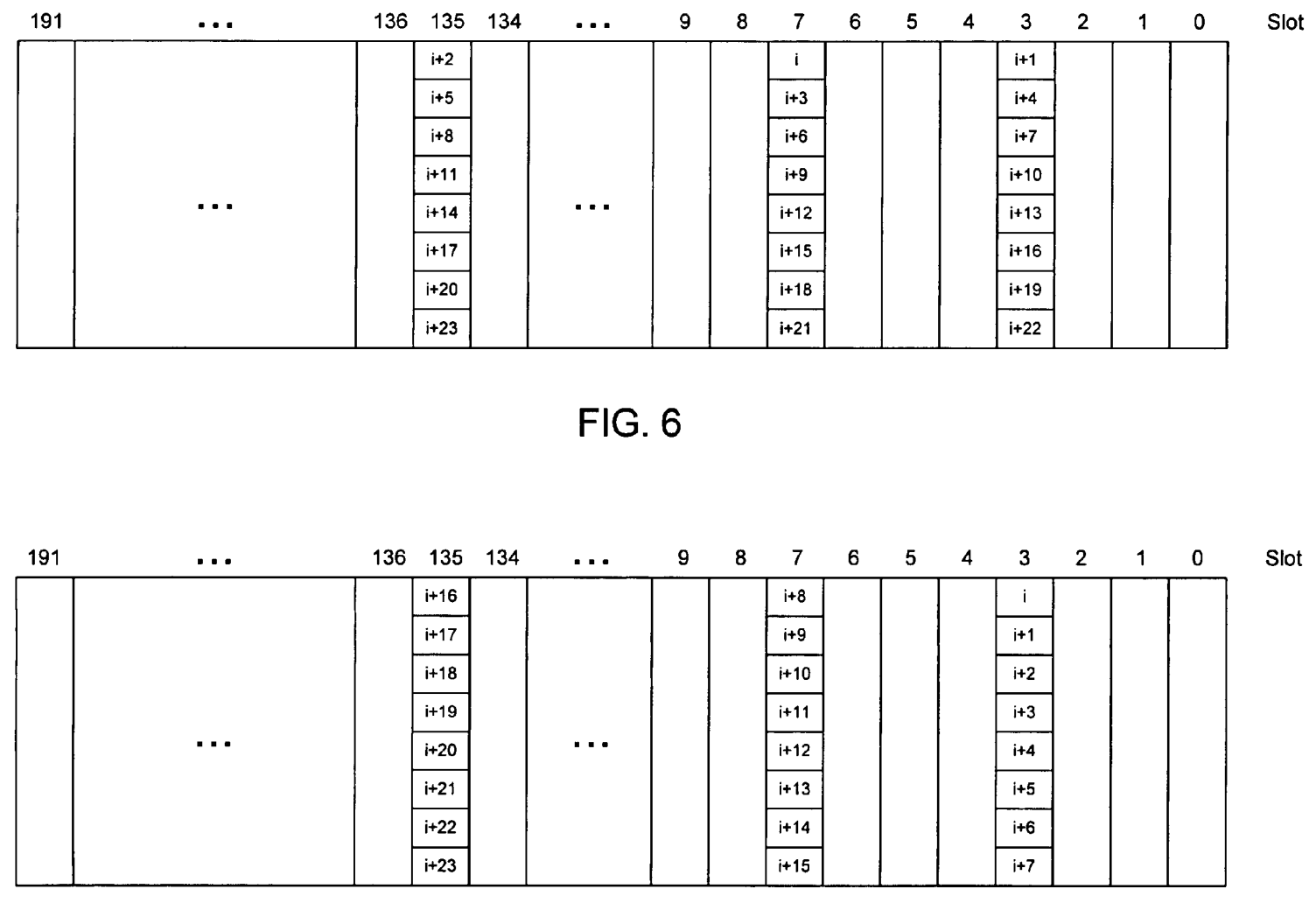

The time slot number in FIG. 6 represents the order data arrives at the de-mapper, or destination 130. The time slot pattern of FIG. 5 repeats every 192 clock cycles. Each STS-1 time slot, or each numbered rectangle in FIG. 5, can be part of a group with higher bandwidth, such as part of a contiguously concatenated payload or a virtually concatenated payload group. Delay compensation, namely compensation for the delay incurred in receiving virtually concatenated payloads at the destination, may have already been provided at the destination, meaning that all virtually concatenated payload members are available for processing.

When the SONET/SDH network transmits a payload, consecutive data bytes distributed over different time slots carry the data stream. Reassembly at the destination 130 puts the data bytes back into their original format. For example, for a VC-3-3v group, time slots 3, 7, and 135 carry the group of data. Time slot 7 is member 0 in the virtual concatenation group. For a single 192 clock cycle in the repeating sequence that begins with data byte i, data is arranged in the order shown in FIG. 6. The last data byte in the segment is i+23. Data in the format shown in FIG. 6 is highly dependent on the format in which the data was received, and depends on various other variables, such as the type of group received, which requires additional processing by the destination 130. Nonetheless, once processed as shown in FIG. 7, the data is generally format independent and can be transmitted from the destination to other locations in the network.

The present design thus works to reassemble the data in a uniform, group format independent arrangement. Once reassembled, the data is as shown in FIG. 7, aligned in slots beginning at slot 3. Using this arrangement, each group, such as group 3, will have the same word number in the repetitive pattern, and a change in one group will not affect any other group. Such data alignment can be beneficial when time slots may vary for each group due to the use of LCAS, Link Capacity Adjustment Scheme.

Once the destination has assembled the data, eight bytes are typically available during every clock cycle. Each of the eight output bytes can be within any of the 192×8=1536 bytes in the repetitive pattern under all possible configurations. Therefore, during every clock cycle, the system can select any 8 bytes from among the 1536 bytes. As the repetitive pattern of FIG. 8 repeats every 192 words, a single repetitive pattern provides all data needed to reconstruct the data word irrespective of the format transmitted. The architecture of FIG. 8 enables the necessary reconstruction.

Figure 8:
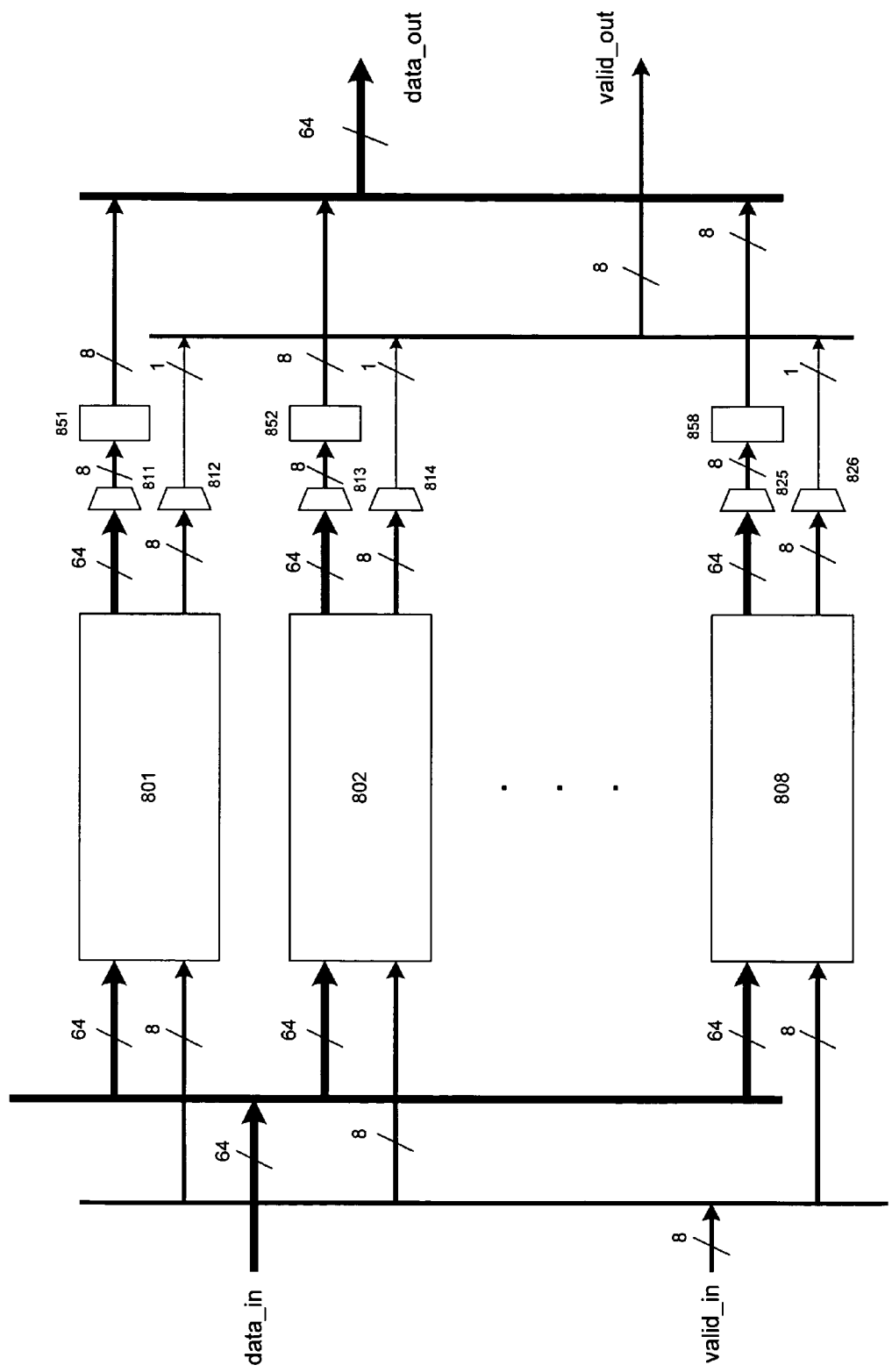
FIG. 8 represents an embodiment of hardware that may be used to implement the present design.

From FIG. 8, data is received over 64 bit input streams together with eight bit validity words. These are multiplexed and provided to eight 384 word wide memory buffers 801-808, which then transmit, in order, 64 bit data outputs and 8 bit validity. Eight sets of 8 to one MUXes 811-826 are provided to multiplex the 64 bit data into 8 bit signals and the 8 bit validities into one bit values. Data is then collected and transmitted over 64 bit output lines together with validity in 8 bit format. Elements 851-858 transmit the eight bit words for each memory buffer, and the outputs of elements 851-858 are concatenated into a single 64 bit word.

Operationally, every 1536 bytes received at the destination are copied into the eight memory buffers 801-808, with one memory for each output byte. By reading the correct word from one particular memory and selecting the byte needed out of the 8 bytes read, the de-mapper can select any byte. A byte that arrives in the last word of the 192-word segment can be selected during the first output word in the 192-word pattern (e.g., a VC-3-2v group that uses slots 0 and 191). Thus the system stores the entire 192-word sequence before any data byte in this segment can be output. Each memory buffer contains 384 words so that one segment can be read while another segment is written. As separate read and write processes occur within every 192 words, the memory buffers 801-808 may comprise two single port memories of 192-word capacity instead of a dual port memory with 384 words. With this arrangement, while reading one memory buffer, the system writes incoming data to the other buffer.

Selection of data occurs as follows. With 192 words to select, the destination 130 uses eight bits are needed to determine the row address. For the eight bytes read from each memory buffer, three bits are required to determine the chosen byte by controlling the MUX selection of individual column address. A total of 11 bits for each of the eight output bytes, or 88 bits, are required for the destination 130 to have the ability to determine each output word. The control memory thus uses a multiple element memory comprising 192 words of 88 bits. The destination de-mapper reads back and forth between the two 192-word segments as described above and writes back and forth in a similar manner, thus enabling read and write access on different memory buffer segments.

Figure 9:
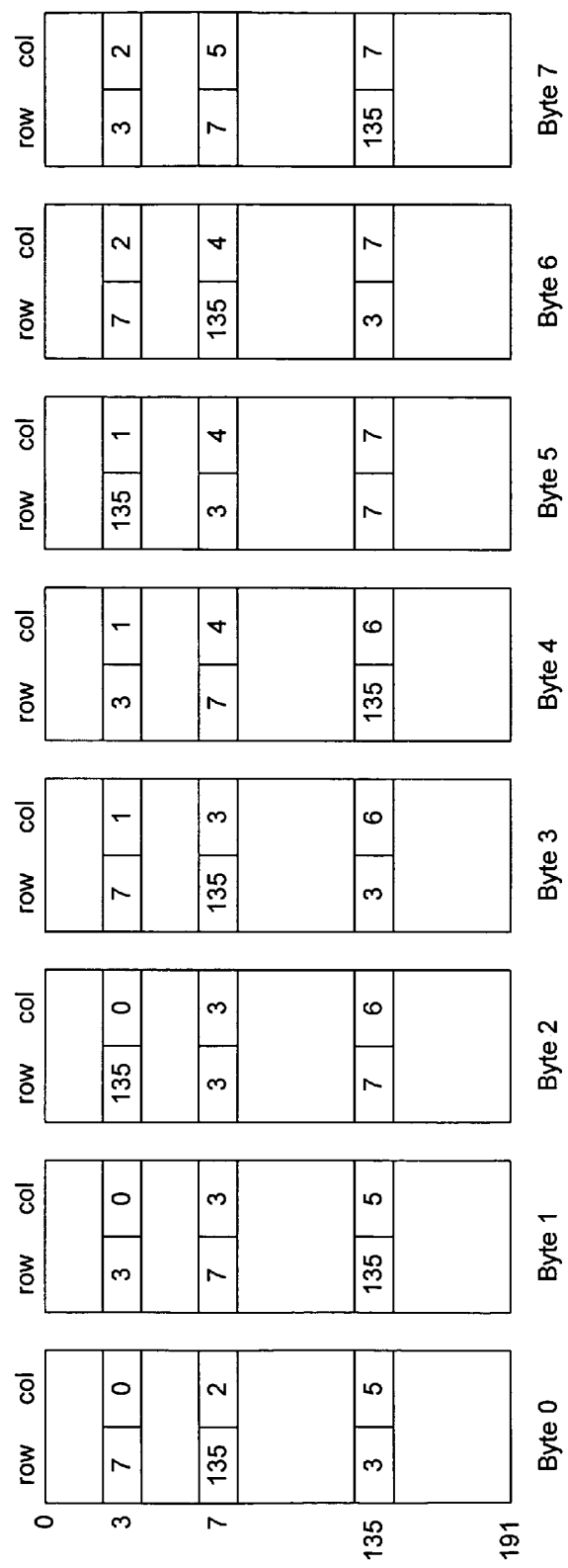
FIG. 9 shows operation of the second control memory.

For the foregoing example of the VC-3-3V group, a configuration for control memory such as that shown in FIG. 9 may be used, where only the relevant part is illustrated. From FIG. 9, byte 0 of output word 3 is read from slot 7 (row 7) and byte 0 (column 0) of each of the 192-word memory segments, and byte 0 of output word 7 is read from slot 135 (row 135), byte 0 (column 0), and so forth. This control memory essentially provides a mapping of data, such as that shown from FIG. 6 to FIG. 7. Changing to a different configuration without interrupting traffic flow occurs in the manner illustrated, namely reassigning data from one location to another, typically using two control memories.

In a typical arrangement in previously available destinations 130, a single control memory is employed. One control memory controlled the selection of the output data bytes. In the current design, when the incoming byte configuration needs to be changed, software programs the second control memory in the background with knowledge of the type of data and format received. When the new configuration is ready, or in other words when programming is complete, the second control memory is then used to control distribution of output data bytes at the 192-word boundary.

Not every incoming word contains valid data. Payload rates may differ, overhead bytes are typically removed prior to processing, different payloads may have different rates due to removal of stuff from certain payloads, and so forth. For time slots in the same group, the payload rates are typically identical. All invalid data words are indicated by the valid_in bits associated with each data word. Even when there is no valid data word available, a word with an invalid indication will be written in the data memory of the assembly process.

Incoming data words may be received from the previous SONET/SDH processing blocks or read from the data FIFO used for differential delay compensation. If the data words are received from previous processing blocks, the same word in all time slots in the same contiguously concatenated payload provides the same valid indication. If the data words are received from the data FIFO used for differential delay compensation, the same condition for all data is guaranteed by the delay compensation process. With uniform validity conditions, data bytes in the assembled output words will always be in the correct order.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for interleaving virtually concatenated and contiguously concatenated data, comprising:
   assigning a virtually concatenated data payload and a contiguously concatenated data payload to time slots in a received order in a first set of hardware data banks in a fiber optics network, wherein the virtually concatenated data payload is variable in size to match a client service data rate, and wherein the contiguously concatenated data payload is fixed in size; and
   distributing the data from time slots in the received order in the first set of hardware banks to time slots in a generic order in a second set of hardware data banks such that contiguous data is included in each time slot;
   wherein said distributing is performed by a control memory and comprises
      determining a group format for the data,
      determining time slots to be employed based on the group format, and
      allocating data to only those time slots to be employed based on the group format.

2. The method of claim 1, wherein said assigning and distributing follow differential delay compensation for any virtually concatenated data.

3. The method of claim 1, wherein said assigning and distributing occur only if data is valid.

4. An apparatus for interleaving virtually concatenated and contiguously concatenated data irrespective of format received without substantially interrupting data flow, comprising:
   a plurality of memory buffers, each memory buffer holding a quantity of received data; and
   a plurality of control memories comprising a first control memory having an ability to select output data from the plurality of memory buffers within a fixed data boundary, and a second control memory having an ability to store a different configuration without interrupting operation of the first control memory, and an additional ability to switch functionality of the first control memory and the second control memory.

5. The apparatus of claim 4, further comprising a plurality of validity lines attached to the plurality of memory buffers, said validity lines indicating the validity of received data.

6. The apparatus of claim 4, wherein each memory buffer receives data over a predetermined size connection, and further comprising a plurality of reduction muxes, each reduction mux associated with one memory buffer, said reduction mux reducing the transmission from each memory buffer to a size value below said predetermined size.

7. The apparatus of claim 6, wherein said predetermined size is 64 bits, and each reduction mux reduces output to eight bits.

8. The apparatus of claim 4, wherein each memory buffer comprises a set of two identically sized memory elements, and wherein operation of said control memories operate to read from the memory elements.

9. The apparatus of claim 4, wherein the control memories distribute the data in time slots in accordance with an order received to time slots in a generic order such that contiguous data is included in each time slot, and further wherein said distributing comprises assessing data format and allocating data to time slots based on assessed data format.

10. The apparatus of claim 9, wherein the control memories distribute data from at least one time slot in the memory buffers in a specified order.

11. The apparatus of claim 4, wherein data received by said memory buffers is differential delay compensated for any received virtually concatenated data.

12. The apparatus of claim 5, wherein said data is received by the plurality of memory buffers only if data is valid.

13. A system comprising:
   a physical layer interface;
   a framer comprising:
      a plurality of memory buffers, each memory buffer holding a quantity of received data; and
      a plurality of control memories comprising a first control memory having an ability to select output data from the plurality of memory buffers within a fixed data boundary, and a second control memory having an ability to store a different configuration without interrupting operation of the first control memory, and an additional ability to switch functionality of the first control memory and the second control memory;
   a network processor; and
   an interface to at least provide intercommunication between the framer and the network processor.

14. The system of claim 13, wherein the interface is compatible with PCI.

15. The system of claim 13, wherein the interface is compatible with PCI-x.

16. The system of claim 13, further comprising a host-control plane controller coupled to the interface.

17. The system of claim 13, wherein the second interface is compatible with PCI.

18. The system of claim 13, wherein the second interface is compatible with PCI-x.

19. The system of claim 13, further comprising a second interface and a system fabric.

20. The system of claim 19, wherein the second interface is compatible with TFI-5.

21. The system of claim 19, wherein the second interface is compatible with CSIX.

22. The system of claim 19, further comprising a line card capable of intercommunicating with the system fabric.

23. The system of claim 22, wherein the line card is capable of providing an interface for a Fibre Channel compatible network.

24. The system of claim 22, wherein the line card is capable of providing an interface for an Ethernet compatible network.

25. The system of claim 22, wherein the line card is capable for performing add-drop multiplexing.

* * * * *